No. 826,678. PATENTED JULY 24, 1906.
J. S. F. MARKS.
PIPE COUPLING.
APPLICATION FILED JAN. 27, 1905.

WITNESSES:
Paul Barnes.
F. Dudley Moss.

INVENTOR.
J. S. F. Marks
BY Pierre Barnes
ATTORNEY.

UNITED STATES PATENT OFFICE.

JOHN S. F. MARKS, OF BALLARD, WASHINGTON, ASSIGNOR TO NATIONAL WOOD PIPE COMPANY, OF SAN FRANCISCO, CALIFORNIA, A CORPORATION OF CALIFORNIA.

PIPE-COUPLING.

No. 826,678.     Specification of Letters Patent.     Patented July 24, 1906.

Application filed January 27, 1905. Serial No. 242,880.

*To all whom it may concern:*

Be it known that I, JOHN S. F. MARKS, a citizen of the United States, residing at Ballard, in the county of King and State of Washington, have invented certain new and useful Improvements in Pipe-Couplings, of which the following is a specification, reference being had therein to the accompanying drawings.

This invention relates to couplings for wooden pipes; and its object is to provide a device of this character which is of inexpensive construction, one which can be conveniently connected to the adjacent ends of the component lengths of a pipe-line, and is capable of reliably coupling the same against any longitudinally-acting strain likely to be encountered.

The invention consists in the novel construction of a coupling, as will be hereinafter particularly described, and illustrated in the accompanying drawings, wherein—

Figure 1:
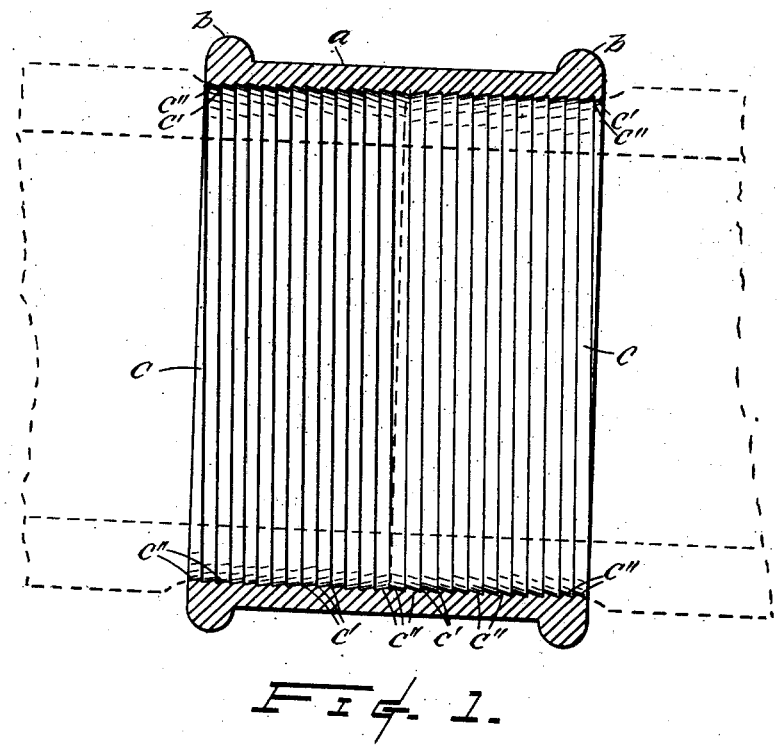
Figure 2:
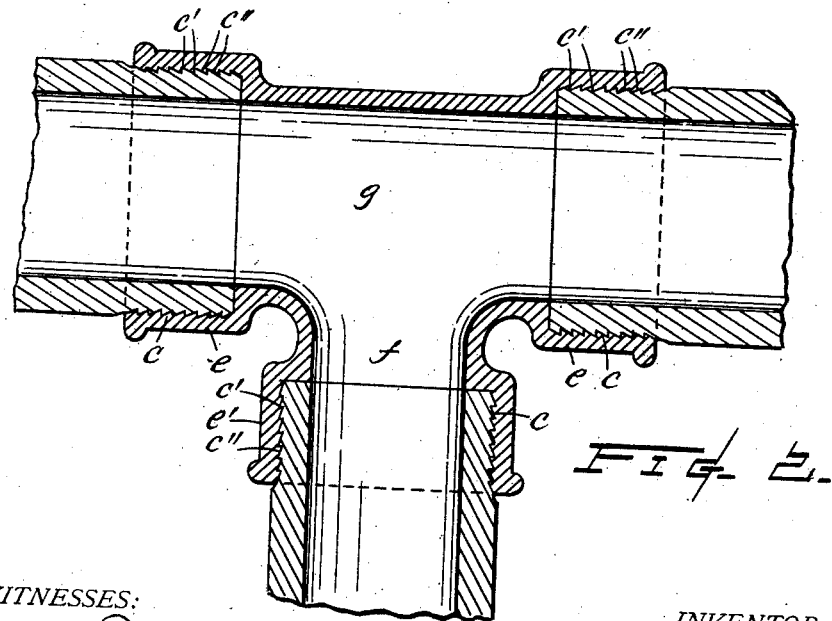

Figure 1 is a longitudinal sectional view of a pipe-coupling, showing an embodiment of my invention, and Fig. 2 is a similar view of a modified form of the same.

In the drawings the reference-letter $a$ indicates a metal sleeve having at its ends external annular reinforcing-rings $b$ to strengthen the same against rupture. The inside of the sleeve is screw-threaded from its opposite ends with reversely-inclined buttress-threads $c$—that is to say, threads having faces $c'$ perpendicular, or approximately so, to the axis of the sleeve—while the other faces $c''$ are but slightly inclined from such axis, and the said faces are so disposed that the last-mentioned ones will be toward the respective sleeve ends. The wooden pipes (indicated by broken lines in Fig. 1) are connected to the couplings by driving or forcing them into the sleeve-sockets under longitudinal pressure, and which by reason of the slanting faces of the securing-threads being presented is accomplished without cutting or materially weakening the wood fibers of the pipe. The resilience or elasticity of the wood, however, is sufficient to expand the contracted or cramped fibers into the interstices between the said threads corresponding to a screw which is able to withstand any longitudinal forces tending to separate the pipe lengths from the coupling members. In fact, I have repeatedly subjected the pipes which have been held together by devices constructed in accordance with this invention, to a hydraulic pressure exceeding four hundred and fifty pounds to the inch and without any apparent elongation to the pipe. The pipe lengths are disconnected from couplings by turning, thereby withdrawing them by unscrewing.

This invention is in no wise limited to a "straight" coupling, for it can obviously be used in a number of other useful applications, as couplings with side outlets, as T's, Y's, crosses, &c., of which an example is shown in Fig. 2 and which I will now describe. In this T-coupling the internally-screw-threaded parts are formed desirably in enlarged terminal hubs or "bells" $e$, which are disposed at such a distance apart as to provide therebetween room to make the side outlet $f$, which in like manner is desirably formed with a terminal hub $e'$. The internal diameter of the straight portion $g$ intermediate the hubs, as well as that of the part $f$ to the inner end of the screw-threaded portion, is preferably made of the same diameters as that of the respective adjoining pipe ends. The advantages of such a construction are apparent as enabling a more extended use of wood pipe.

Having described my invention, what I claim as new, and desire to secure by Letters Patent, is—

1. As a new article, a pipe-coupling consisting of a sleeve having an internal screw-thread with one vertical face and one inclined face, the inclined face extending from the point where it joins the vertical face toward the center of the coupling from the end and toward the longitudinal axis of the same.

2. As a new article of manufacture, a metallic pipe-coupling having an internal screw-thread with one surface of the screw-thread substantially at right angles to the longitudinal axis of the coupling, and the other surface of the thread at an obtuse angle to the longitudinal axis of the coupling.

3. The combination with a pipe-coupling, provided with an internal drive screw-thread with one vertical face and one inclined face, of a wooden pipe having primarily a plain external surface, said pipe being driven into said coupling so as to form screw-threads on the pipe conforming to the screw-threads in the coupling.

In testimony whereof I affix my signature in presence of two witnesses.

JOHN S. F. MARKS.

Witnesses:
 PAUL BARNES,
 F. DUDLEY MOSS.